Oct. 4, 1932. J. R. VAN WINKLE 1,880,607
ADVERTISING MEANS FOR STORES AND THE LIKE
Filed Feb. 7, 1930 5 Sheets-Sheet 4
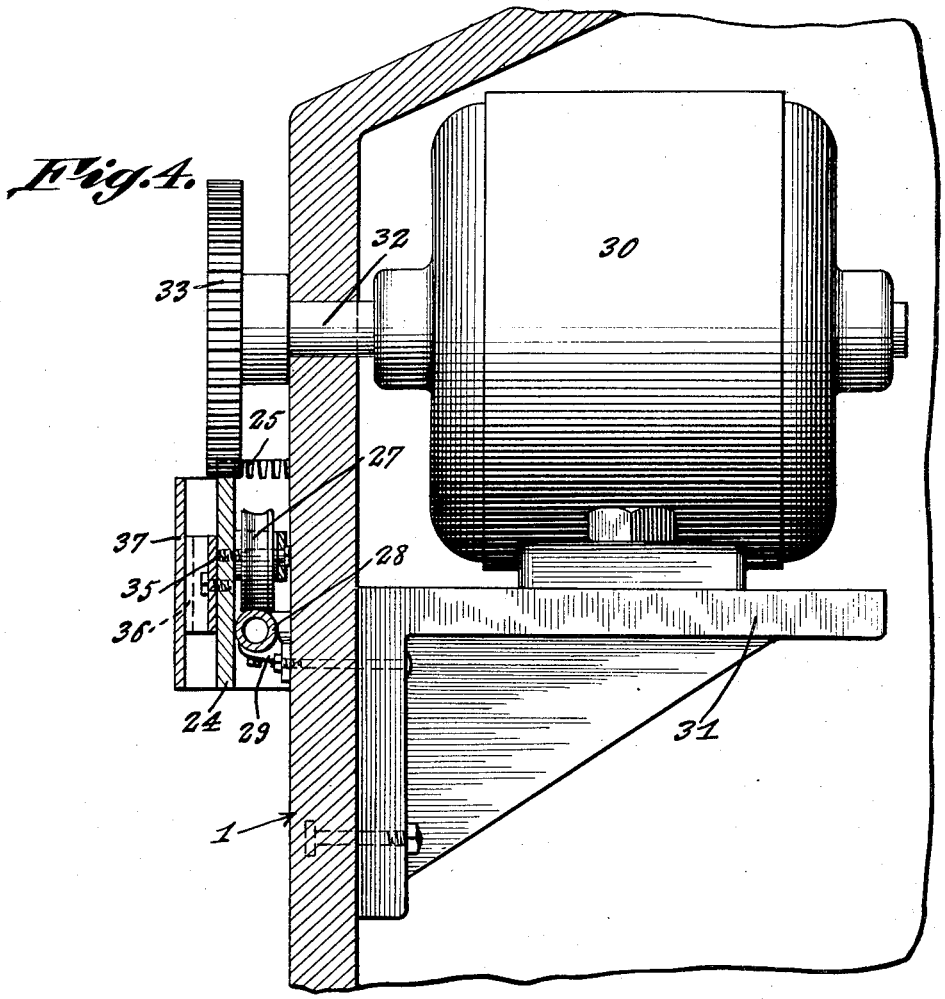
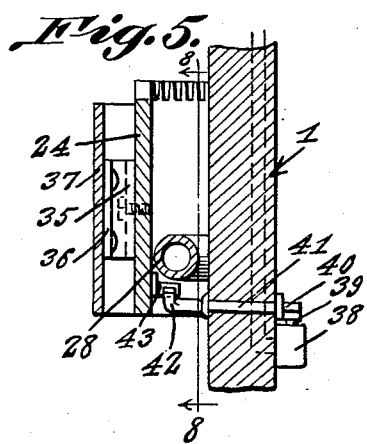
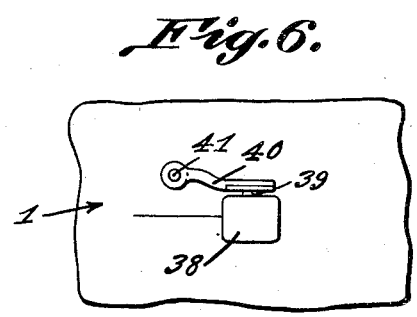
J. R. Van Winkle INVENTOR
BY Victor J. Evans
ATTORNEY

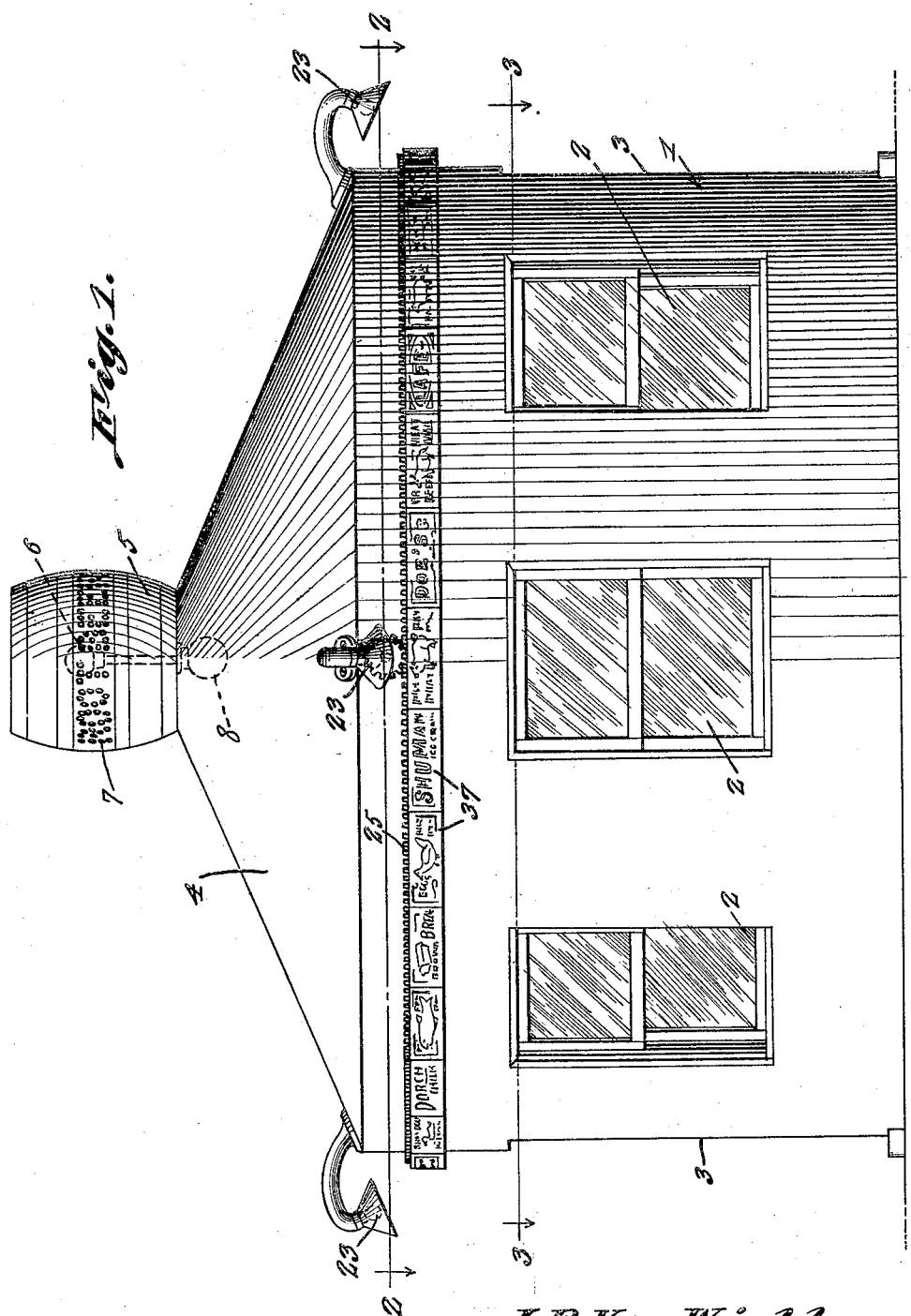

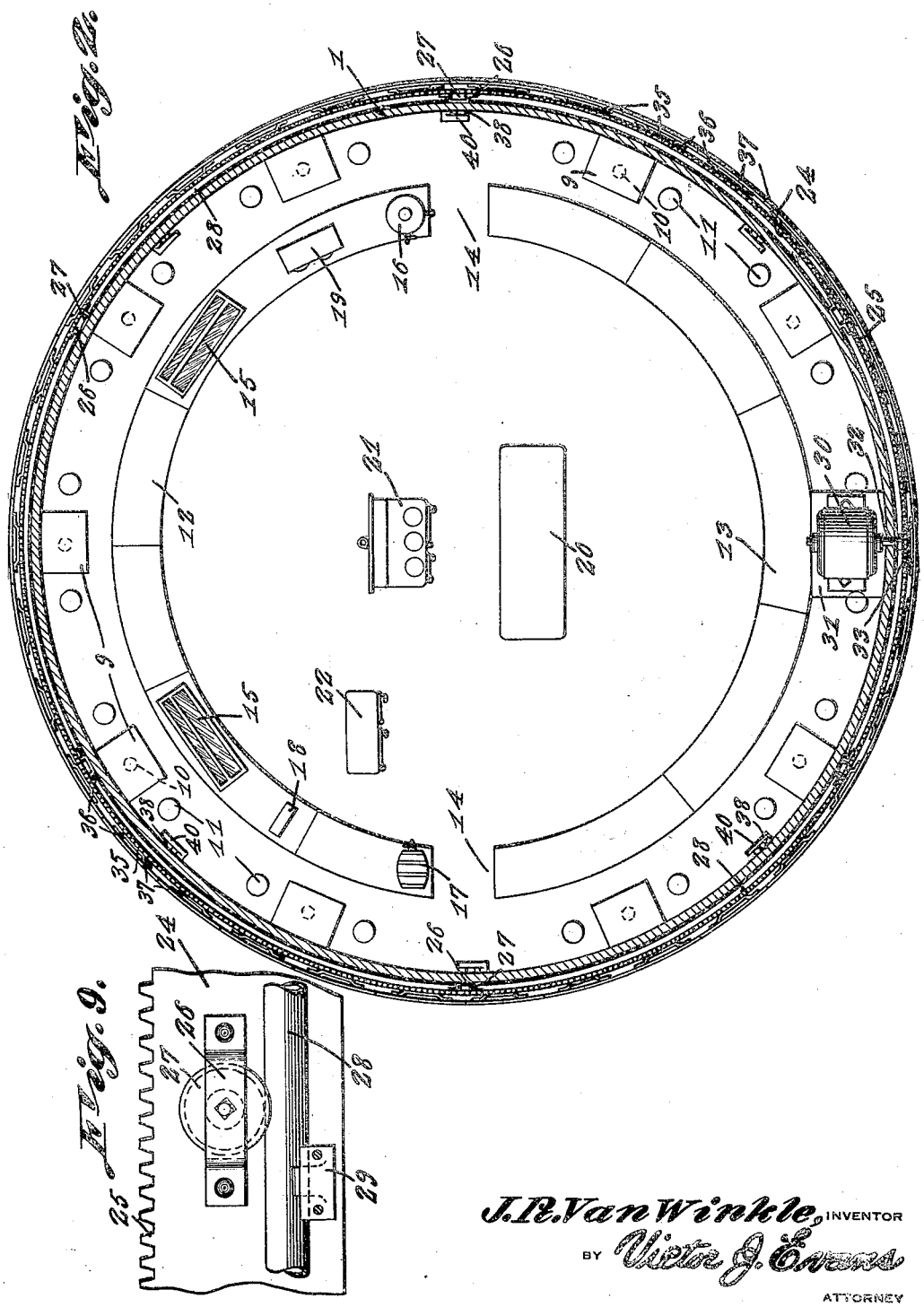

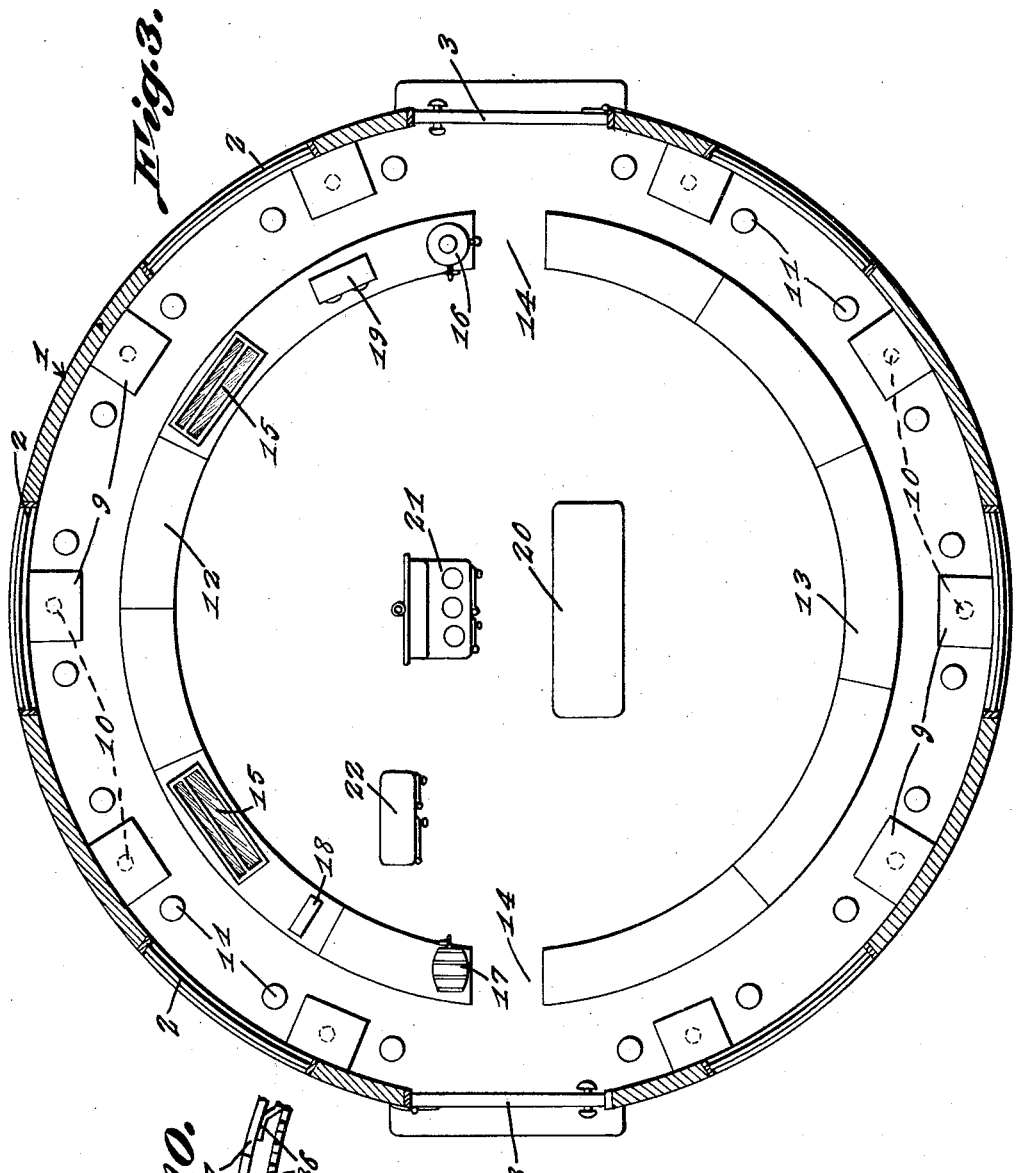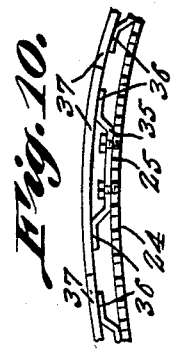

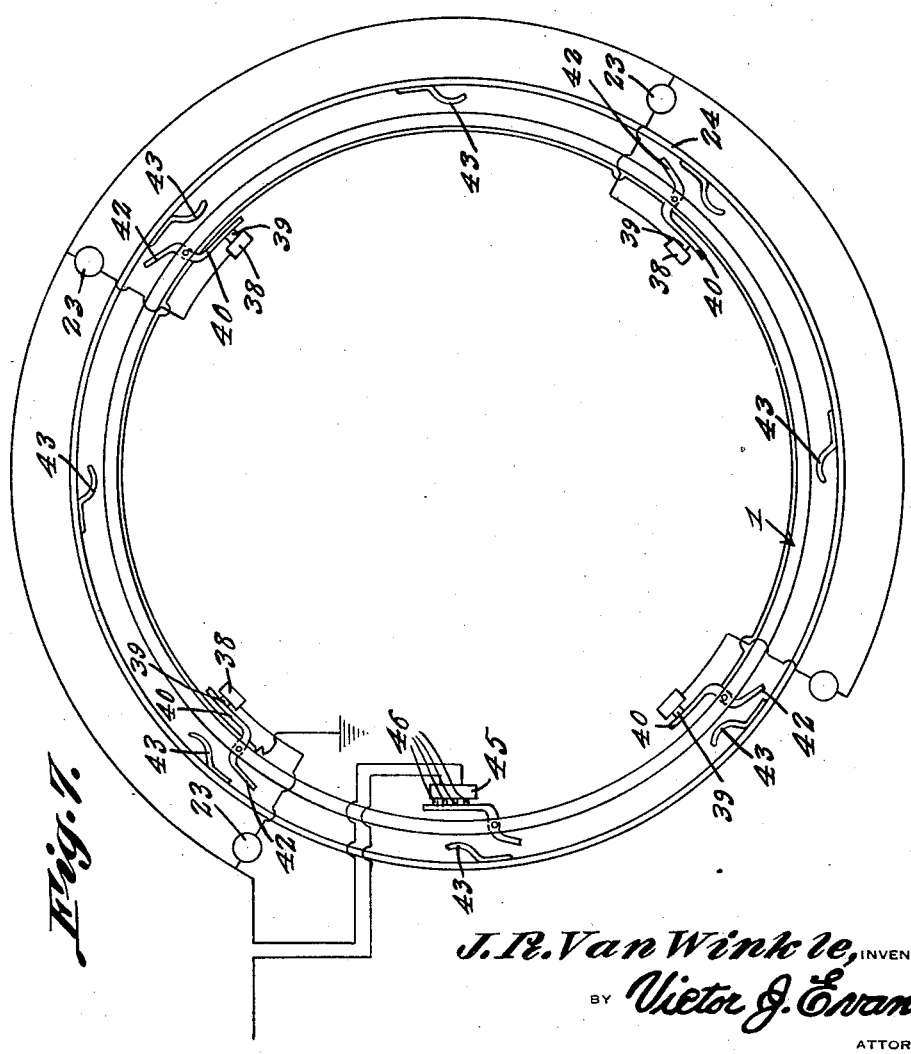

Patented Oct. 4, 1932

1,880,607

UNITED STATES PATENT OFFICE

JOSEPH R. VAN WINKLE, OF QUITAQUE, TEXAS

ADVERTISING MEANS FOR STORES AND THE LIKE

Application filed February 7, 1930. Serial No. 426,642.

This invention relates to improvements in advertising means for stores and also to a novel store construction and, while the invention, as disclosed, relates primarily to a store for dispensing soft drinks, foods, and food products, it may of course find embodiment in other structures.

Another object of the invention is to provide a store structure which will embody a novel arrangement whereby the products or commodities to be sold in the store or café, may be very attractively advertised and, in this connection, the invention contemplates means whereby an annular series of signs may be both successively illuminated, in groups, and also all illuminated at one time, so that the advertising signs will attract the attention of pedestrians.

Another object of the invention is to provide a store structure of substantial cylindrical form having a roof or dome about which the advertising matter is carried in a rotary path, the invention also contemplating a novel means whereby the display surface may have successive portions automatically illuminated.

Another object of the invention is to provide a store or café structure, of the class above referred to, in which the store furniture and appurtenances are so arranged therein as to facilitate a dispensing of commodities or lunches.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which:—

Figure 1 is a view in side elevation of a store or café erected in accordance with the present invention.

Figure 2 is a horizontal sectional view taken substantially on the line 2—2 of Figure 1 looking in the direction indicated by the arrows.

Figure 3 is a similar view on the line 3—3 of Figure 1.

Figure 4 is a detail view partly in elevation and partly in section, illustrating the manner in which the annular advertising medium is supported for rotation about the upper portion of the store or café structure.

Figure 5 is a similar view illustrating an arrangement of a circuit closing device for controlling the supply of current to electric lamps for illuminating the annular display member.

Figure 6 is a view in side elevation illustrating a portion of the structure shown in Figure 5.

Figure 7 is a view partly in plan and partly diagrammatic illustrating the circuit closing means.

Figure 8 is a fragmentary view in elevation, illustrating coacting parts of the circuit closing device.

Figure 9 is a detail fragmentary view in elevation of the means for supporting the annular advertising medium.

Figure 10 is a view in top plan illustrating a portion of the advertising medium, and the signs supported thereon.

The store or café structure is, as illustrated in the drawings, preferably of cylindrical form and the outer wall thereof is indicated in general by the numeral 1 and windows 2 are arranged at intervals about the circumference of the structure, and doors 3 are preferably arranged at diametrically opposite sides of the structure. Upon the top of the structure, there is provided a roof which is indicated by the numeral 4 and which is preferably of the dome shape shown best in Figure 1 of the drawings, and as an example of the invention there is mounted upon the apex of the roof a representation of a barrel, indicated by the numeral 5, and within this barrel there is arranged an arc light indicated by the numeral 6 and advertising matter as for example the words "Root beer" is represented by colored glass jewels 17 arranged in openings in the wall of the barrel. Likewise an arc light 8 is arranged within the roof, substantially at the apex thereof and beneath the barrel and serves to illuminate the entire interior of the structure.

Upon the floor of the structure and between, opposite, or adjacent to the windows 2, as may be desired, there are arranged tables 9 which may each be supported by a single leg 10, and stools or chairs 11 are preferably arranged at the opposite ends of each table. Also mounted upon the floor of the structure are two semi-circular counters, indicated one by the numeral 12 and the other by the numeral 13, the counters being preferably spaced at their corresponding end portions to provide aisles 14 which are arranged opposite the respective doors 3. The counters may be provided, below their tops, with shelves or the like, (not shown) so that this space beneath certain portions of the counters may constitute a storage space, and display cabinets or cases 15 may be arranged at any desired points upon one of the counters as for example, the counter 12 and a coffee urn 16 may be arranged, for example, at one end of the counter 12 and a root beer or other soft drink barrel 17 may be arranged at the other end of this counter, a cash register 18 being also arranged upon the counter 12 near one end thereof, and a dish shelf 19 being arranged upon the top of the counter near the other end thereof. A work table 20 may be arranged upon the floor of the structure at one side of the center thereof and between the ends of the counter 13, and a cooking range 21 may be arranged upon the floor opposite the table and midway between the ends of the counter 12, a refrigerator 22 being arranged at either side of the range 21 in suitably spaced relation with respect thereto and adjacent one end of the counter 12.

Arc lights 23 are arranged at intervals about the roof 4 substantially at the periphery thereof and so positioned that the rays therefrom will be directed downwardly over the outer surface of the wall of the structure, and these arc lights serve to illuminate the rotary advertising medium of the invention, which will now be described.

The advertising display means includes, in its structure a ring gear 24 which is of a diameter slightly greater than the diameter of the wall 1 of the structure and the teeth 25 of this gear are provided at the upper edge thereof. At intervals in its circumference the gear has fixed upon its inner side, a plurality of brackets 26 in which are journalled rollers 27, the peripheries of which are of arcuate form in cross section, and these rollers rest and travel upon an annular tubular rail 28, which surrounds the body 1 of the structure and is supported by means of brackets 29 arranged at suitable intervals about the wall 1 and formed to accommodate the under side of the rail. An electric motor 30 is mounted upon a suitable bracket 31 upon the inner side of the wall 1 and, upon the shaft 32 of this motor, there is mounted a gear 33 which meshes with the teeth 25 of the ring gear 24. Secured, at intervals, upon the outer side of the ring gear are brackets 35 having outstanding diverging end portions 36, to which are secured or anchored, in any suitable manner, arcuate sign plates, indicated by the numeral 37, and these plates may bear any desired advertising matter, and preferably they will be so arranged as to be in endwise abutting relation to one another throughout the entire series.

Each of the arc lights 23 is in circuit with a circuit closing unit 38, and this circuit closer includes an element 39 which is engageable by an arm 40 mounted upon one end of a short shaft 41, which shaft is mounted in the wall 1 of the structure, and these shafts are preferably arranged in a horizontal plane adjacent the plane occupied by the lower edge of the rotary ring gear 24. Each shaft 41 is provided at its outer end and exteriorly of the structure, with an upwardly curved arm indicated by the numeral 42, and similarly curved arms 43 are secured as at 44 to the inner side of the ring gear 24 and are spaced apart a distance corresponding to the spacing of the shafts 41, and so positioned that, in the rotation of the ring gear, these arms 43 will successively ride over the arms 42 upon the shafts 41, thus rocking the shafts to elevate the respective arms 40 and break the circuits through the arc lights 23, successively, it being understood that otherwise, the arc lights remain energized. One of the circuit closing units, which is indicated specifically by the numeral 45, in Figure 7 of the drawings, is so connected, electrically, with the circuit for the arc lights 23, so that when any one of the arms 40 rides over and bridges contacts 46, in circuit with the respective one of the arc lights, all of the arc lights will be energized.

What I claim is:

The combination of a supporting structure, a track mounted upon said structure and circumscribing the same, illuminators mounted upon the structure and arranged to cast rays of light toward the track, a band surrounding the track and interposed between the track and the illuminators, wheels mounted at the inner side of the band and engaging the track and means for moving the band around the track.

In testimony whereof I affix my signature.

JOSEPH R. VAN WINKLE.